US011698261B2

(12) United States Patent
Li et al.

(10) Patent No.: US 11,698,261 B2
(45) Date of Patent: Jul. 11, 2023

(54) METHOD, APPARATUS, COMPUTER DEVICE AND STORAGE MEDIUM FOR DETERMINING POI ALIAS

(71) Applicant: BEIJING BAIDU NETCOM SCIENCE AND TECHNOLOGY CO., LTD., Beijing (CN)

(72) Inventors: Yanyan Li, Beijing (CN); Jianguo Duan, Beijing (CN); Hui Xiong, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 474 days.

(21) Appl. No.: 16/710,566

(22) Filed: Dec. 11, 2019

(65) Prior Publication Data

US 2020/0326197 A1 Oct. 15, 2020

(30) Foreign Application Priority Data

Apr. 11, 2019 (CN) .......................... 201910290646.0

(51) Int. Cl.
*G01C 21/34* (2006.01)
*G06N 20/00* (2019.01)
(Continued)

(52) U.S. Cl.
CPC ......... *G01C 21/3476* (2013.01); *G06F 16/29* (2019.01); *G06F 40/242* (2020.01); *G06N 20/00* (2019.01)

(58) Field of Classification Search
CPC . G01C 21/3476; G01C 21/3679; G06F 16/29; G06F 40/242; G06F 40/284;
(Continued)

(56) References Cited

U.S. PATENT DOCUMENTS

2009/0234847 A1* 9/2009 Homma ............. G01C 21/3611
704/E15.005
2009/0281716 A1* 11/2009 Jung .................. G01C 21/3811
701/426
(Continued)

FOREIGN PATENT DOCUMENTS

CN 107016055 A 8/2017
CN 107491537 A * 12/2017 ............. G06F 16/29
(Continued)

OTHER PUBLICATIONS

CN-108717439-A Translation (Year: 2018).*
Office action dated Sep. 2, 2020 in Chinese application No. 201910290646.0.

*Primary Examiner* — Khoi H Tran
*Assistant Examiner* — Tristan J Greiner
(74) *Attorney, Agent, or Firm* — Knobbe, Martens, Olson & Bear, LLP (57) ABSTRACT

Embodiments of the present disclosure provide a method, apparatus, computer device, and storage medium for determining a POI alias. The method may include: acquiring a to-be-processed target POI, and generating a candidate alias list corresponding to the target POI based on a query behavior-associated log matching the target POI; and screening out at least one target alias corresponding to the target POI in the candidate alias list, according to an association relationship between each candidate alias in the candidate alias list and the target POI.

15 Claims, 4 Drawing Sheets

(51) Int. Cl.
*G06F 16/29* (2019.01)
*G06F 40/242* (2020.01)
(58) Field of Classification Search
CPC ........ G06F 40/295; G06N 20/00; G06N 3/08; G06N 5/003; G06N 20/20; G06N 20/10
See application file for complete search history.

(56) References Cited

U.S. PATENT DOCUMENTS

| | | | | |
|---|---|---|---|---|
| 2011/0109435 A1* | 5/2011 | Bickel | ................ | G01C 21/3679 |
| | | | | 340/8.1 |
| 2015/0169626 A1 | 6/2015 | Byun | | |
| 2017/0344617 A1* | 11/2017 | Sen | ....................... | G06F 16/313 |
| 2021/0055124 A1* | 2/2021 | Zhong | .................... | G06F 16/29 |

FOREIGN PATENT DOCUMENTS

| | | | | |
|---|---|---|---|---|
| CN | 107491537 A | | 12/2017 | |
| CN | 108717439 A | * | 10/2018 | ......... G06F 17/2775 |

* cited by examiner

METHOD, APPARATUS, COMPUTER DEVICE AND STORAGE MEDIUM FOR DETERMINING POI ALIAS

CROSS-REFERENCE TO RELATED APPLICATIONS

This application claims priority to Chinese Patent Application No. 201910290646.0, filed with the China National Intellectual Property Administration (CNIPA) on Apr. 11, 2019, the contents of which are incorporated herein by reference in their entirety.

TECHNICAL FIELD

Embodiments of the present disclosure relate to data processing technologies, and specifically to a method, apparatus, computer device, and storage medium for determining a POI alias.

BACKGROUND

With the development of science and technology and the continuous advancement of Internet technology, services provided by mobile terminals are constantly upgrading. Currently, location-based services (LBS) is a hotspot in present mobile terminal services.

In LBS, Point of Interest (POI) has become a standard for measuring the value of LBS. Here, POI is an important constituting part of regional vitality, which may specifically include retail stores, food stores, entertainment venues or universities. In fact, different POIs have different names, and the names are used to identify the POIs. Similarly, similar to a person having a name and a nickname, a POI also has a standard name and an alias. The more familiar people are, the more they like to call our nicknames. Similarly, the more familiar people are with a POI, the more they like to call the POI by its alias. Through the study of POI aliases, POI can be better portrayed, and it may be applied to related scenarios such as service and map retrieval, travel and taxi taking.

At present, methods for acquiring a POI alias mainly include the following three methods: user uploading user generated content (UGC), uploading professionally-generated content (PGC), and web crawler method. Here, the disadvantages of the UGC method are: first, it is required to get the enthusiasm of user uploading through operational activities. Secondly, due to the randomness of user level, data quality is uncontrollable. It is of large probability that the data quality is poor, and high manpower is required for review. The disadvantages of the PGC method are: first, the cost is high, and it is required to pay high labor cost, equipment cost, and transportation cost. At the same time, the coverage rate of acquisition is low, similarly, due to the high costs, the aging is often low. The disadvantage of the web crawler method is: since the POIs and aliases are generally less present on the network, the coverage rate is low.

SUMMARY

Embodiments of the present disclosure provide a method and apparatus for determining a POI alias, a computer device and storage medium, which may improve the efficiency of acquiring a POI alias, reduce the cost of acquiring a POI alias, and improve the coverage rate of POI.

According to a first aspect, some embodiments of the present disclosure provide a method for determining a POI alias, including:

acquiring a to-be-processed target POI, and generating a candidate alias list corresponding to the target POI based on a query behavior-associated log matching the target POI;

screening out at least one target alias corresponding to the target POI in the candidate alias list, based on association relationships between candidate aliases in the candidate alias list and the target POI.

According to a second aspect, some embodiments of the present disclosure provide an apparatus for determining a POI alia, including:

a candidate alias list generation module, configured to acquire a to-be-processed target POI, and generate a candidate alias list corresponding to the target POI based on a query behavior-associated log matching the target POI;

a target alias screening module, configured to screen out at least one target alias corresponding to the target POI in the candidate alias list, based on association relationships between candidate aliases in the candidate alias list and the target POI.

According to a third aspect, some embodiments of the present disclosure provide a device, including memory, a processor and computer programs which is stored on the memory and may run on the processor, when the program is executed by the processor, the method for determining a POI alias according to any of the embodiments of the present disclosure is implemented.

According to a fourth aspect, some embodiments of the present disclosure further provide a computer readable medium, storing a computer program thereon, the program, when executed by a processor, implements the method for determining a POI alias according to any of the embodiments of the present disclosure is implemented. Embodiments of the present disclosure acquire the query behavior-associated log matching the target POI, and querying query data directing at the target POI in the query behavior-associated log. With the popularity of the Internet, a large amount of query data directing at the target POI of network users may be acquired. On this basis, the candidate alias list is generated based on the query behavior-associated logs, and the coverage rate of the candidate aliases is greatly improved. At the same time, at least one target alias corresponding to the target POI is screened out according to the association relationships between candidate aliases and the target POI, implementing accurately determining a POI alias, solving the problems of low efficiency, low accuracy, high cost and low coverage rate of POI alias generation in the prior art, which may improve the coverage rate of the POI candidate aliases. At the same time, screening from a large number of POI candidate aliases may improve the probability of the target alias in the candidate alias list, thereby improving the accuracy of determining an alias, and avoiding the manual generation of a POI alias, improving the efficiency of determining a POI alias, and reducing the cost of determining a POI alias.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

Embodiment 1

Figure 1A:
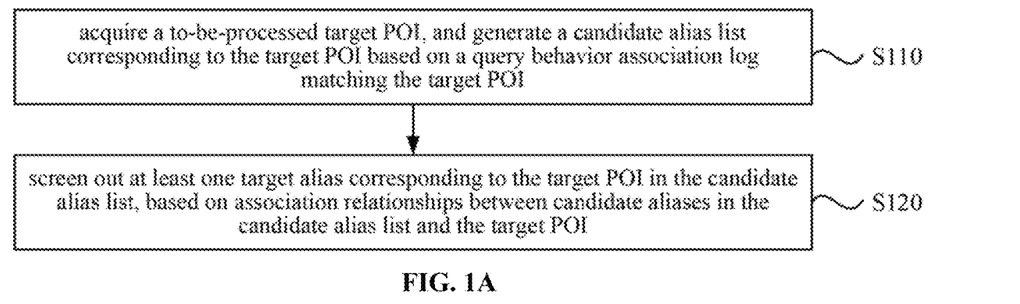
FIG. 1A is a flowchart of a method for determining a POI alias according to Embodiment 1 of the present disclosure.

FIG. 1A is a flowchart of a method for determining a POI alias in Embodiment 1 of the present disclosure. The present embodiment may be applied to cases of determining a POI alias. The method may be implemented by an apparatus for determining a POI alias provided by an embodiment of the present disclosure. The apparatus may be implemented in software and/or hardware, and may be generally integrated into a computer device that provides a service for determining a POI alias, such as a smartphone, a tablet, a vehicle-mounted terminal, or a server. As shown in FIG. 1A, the method in the present embodiment specifically includes:

S110, acquiring a to-be-processed target POI, and generating a candidate alias list corresponding to the target POI based on a query behavior-associated log matching the target POI.

Here, POI may refer to a certain point on an electronic map that denotes the function represented by the point, for example, it may identify a location such as a government department, commercial organization (gas station, department store, supermarket, restaurant, hotel, or convenience store, etc.), tourist attraction, infrastructure (park, public toilet or hospital, etc.), or transportation facility (station, parking lot or speed limit sign, etc.) represented by the point. Typically, a POI includes at least one of the following: name, category, longitude, latitude, altitude, etc.

In the present embodiment, the complete and generic name of the POI is used as the standard name, and other names that may be used to identify the POI are aliases. As an example, the standard name of the secondary school on the A street is the eleventh middle school, and the alias may be $11^{th}$ middle school, eleven middle school, etc.

The query behavior-associated log is used to record data of query behavior directing at the target POI by a network user in an application providing LBS. A candidate alias is used to represent a name that may be an alias of the target POI. The candidate alias list is used to store candidate aliases.

Based on the query behavior-associated log, a search keyword input by the network user and a keyword in the selected query result may be acquired. If the search keyword is different from the keyword in the query result, the target POI may be determined based on the keyword in the query result, and the search keyword is used as an alias of the target POI. In addition, it may be implemented in other methods, and the embodiments of the present disclosure do not specifically limit in this regard.

Alternatively, the generating a candidate alias list corresponding to the target POI based on a query behavior-associated log matching the target POI, includes at least one of the following: in a map application, screening out a first type of query behavior-associated log of being navigated to the target POI selected by a user in a first query result page, and generating the candidate alias list based on a first query formula matching the first query result page in the first type of query behavior-associated log; in a review application, screening out a second type of query behavior-associated log of purchasing a service item corresponding to the target POI selected by the user in a second query result page, and generating the candidate alias list based on a second query formula matching the second query result page in the second type of query behavior-associated log; in a taxi application, and screening out a third type of query behavior-associated log of taking a taxi to the target POI selected by the user in a third query result page, and generating the candidate alias list based on a third query formula matching the third query result page in the third type of query behavior-associated log.

The query result page is used to display query results provided by the application directing at the query formula input by the user. The query formula is used by the application for querying. It may be understood that the user usually inputs a customary name of the target POI, and the result finally selected by the user in the query result page includes the standard name of the target POI. Thus, the target POI may be determined by the result selected by the user in the query result page. At the same time, the name input by the user is added to the candidate alias list as an alias for the target POI.

The first type of query behavior-associated log is used to record query data associated with navigation in a map application. The first query formula is used by the map application to query a navigation destination input by the user. As an example, the first query formula is 11 middle school, and the user selects in the query result page navigating to the eleventh middle school, thereby it is determined that the standard name of the target POI is the eleventh middle school, and a corresponding candidate alias is 11 middle school. Thus, 11 middle school may be added to the candidate alias list with the target POI being eleventh middle school.

The second type of query behavior-associated log is used to record query data associated with purchasing a service item in a review application. The second query formula is used by the review application to query a to-be-purchased item input by the user. As an example, the second query formula is lambskin, and the purchased service item selected by the user selects in the query result page is Givenchy lipstick, thereby it is determined that the standard name of the target POI is Givenchy lipstick, and a corresponding candidate alias is lambskin. Thus, lambskin may be added to the candidate alias list with the target POI being Givenchy lipstick.

The third type of query behavior-associated log is used to record query data associated with taking a taxi in a taxi application. The third query formula is used by the taxi application to query a taxi departure point and a taxi destination input by the user. As an example, the third query formula is KFC, and the taking a taxi to Kentucky Fried Chicken is selected by the user in the query result page, thereby it is determined that the standard name of the target POI is Kentucky Fried Chicken, and a corresponding candidate alias is KFC. Thus, KFC may be added to the candidate alias list with the target POI being Kentucky Fried Chicken.

By acquiring the query behavior data of the user, and acquiring the target POI and a corresponding candidate alias based on the query result of the query behavior, a candidate alias list is quickly generated. In addition, with the popularity of the Internet, the scale of the query behavior data is increasingly large, screening candidate aliases from a large number of query behavior data may greatly improve the coverage rate of the candidate aliases.

It should be noted that the application may also be other application that can provide LBS service, for example, a travel application, and the embodiments of the present disclosure do not specifically limit in this regard.

S120, screening out at least one target alias corresponding to the target POI in the candidate alias list, based on association relationships between candidate aliases in the candidate alias list and the target POI.

Here, the association relationship is used to evaluate the degree of correlation between a candidate alias and the target POI. Specifically, the similarity between the candidate alias and the standard name of the target POI may be calculated to represent the association relationship between the candidate alias and the target POI. The target alias is used to identify the target POI. Typically, the target alias refers to a name other than the standard name of the target POI.

Alternatively, before screening out at least one target alias corresponding to the target POI in the candidate alias list, the method further includes: eliminating a candidate alias that is consistent with a standard name of the target POI from the candidate alias list, and/or eliminating a candidate alias with an occurrence number less than a set number threshold in the query behavior-associated log from the candidate alias list.

Specifically, preliminary screening of the candidate alias list may be performed in advance. In fact, aliases are used by most people, but not names of the standard names. As an example, the target POI and the corresponding candidate alias list may be determined by building a sequence. For example, a sequence <Query1,Query2,POI1,POI2> is extracted from a query behavior-associated log. Queryn represents a candidate alias, and POIn represents the standard name, which respectively constitute candidate sets <Query1,POI1> and <Query2,POI2>. By pre-setting a rule, Query consistent to the POI name may be removed, and relationship pair occurring in low frequency may be removed.

By screening and removing the alias which is identical with the standard name of the target POI, and/or screening and removing the aliases that are used less frequently, the standard name of the POI that cannot be an alias and the aliases that only a few users know and are not very popular may be filtered, implementing screening of the candidate alias list, reducing the amount of data for discriminating the candidate aliases, and improving the efficiency of determining the target alias.

Figure 1B:
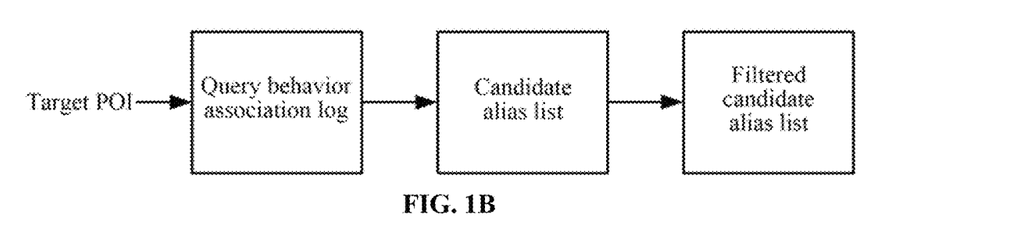
FIG. 1B is a schematic diagram of an application scenario applied in Embodiment 1 of the present disclosure.

In a specific example, as shown in FIG. 1B, the query behavior-associated log is acquired based on the target POI, thereby screening the candidate alias list, and filtering is performed based on a preset rule to obtain a filtered candidate alias list. The target alias is selected from the filtered candidate alias list, thereby improving the accuracy of determining an alias.

Embodiments of the present disclosure acquire the query behavior-associated log matching the target POI, the query behavior-associated log including query data directing at the target POI. With the popularity of the Internet, a large amount of query data directing at the target POI of network users may be acquired. On this basis, the candidate alias list is generated based on the query behavior-associated logs, and the coverage rate of the candidate aliases is greatly improved. At the same time, at least one target alias corresponding to the target POI is screened out according to the association relationships between candidate aliases and the target POI, implementing accurately determining a POI alias, solving the problems of low efficiency, low accuracy, high cost and low coverage rate of POI alias generation in the prior art, which may improve the coverage rate of the POI candidate aliases. At the same time, screening from a large number of POI candidate aliases may improve the probability of the target alias in the candidate alias list, thereby improving the accuracy of determining an alias, and avoiding the manual generation of a POI alias, improving the efficiency of determining a POI alias, and reducing the cost of determining a POI alias.

Embodiment 2

Figure 2A:
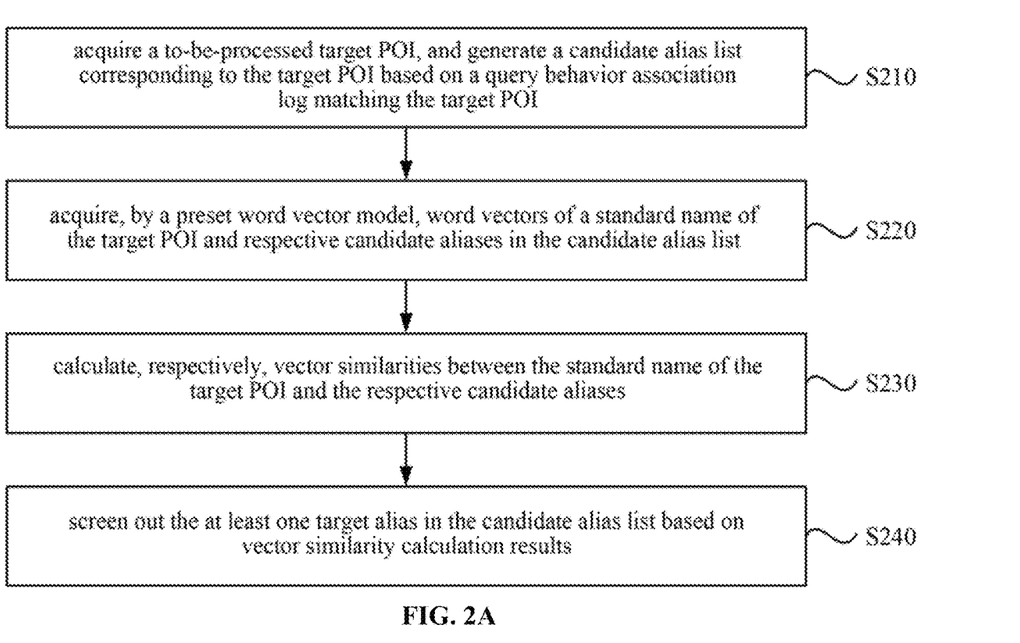
FIG. 2A is a flowchart of a method for determining a POI alias according to Embodiment 2 of the present disclosure.

FIG. 2A is a flowchart of a method for determining a POI alias in Embodiment 2 of the present disclosure. The present embodiment is further embodied on the basis of the foregoing embodiment, and the screening out at least one target alias corresponding to the target POI in the candidate alias list, based on an association relationship between candidate aliases in the candidate alias list and the target POI, is embodied as: acquiring at least one alias description feature corresponding to candidate aliases in the candidate alias list; inputting the at least one alias description feature of the candidate aliases into a pre-trained POI alias identification model, and acquiring alias probabilities corresponding to the candidate aliases output by the POI alias identification model; and screening out the at least one target alias in the candidate alias list based on the alias probabilities of the candidate aliases. The method specifically includes:

S210, acquiring a to-be-processed target POI, and generating a candidate alias list corresponding to the target POI based on a query behavior-associated log matching the target POI.

For details of the target POI, the query behavior-associated log, the association relationship, the standard name, and the target alias in the present embodiment, reference may be made to the description of the foregoing embodiment.

Here, the generating a candidate alias list corresponding to the target POI based on a query behavior-associated log matching the target POI, includes at least one of the following: in a map application, screening out a first type of query behavior-associated log of navigating to the target POI selected by a user in a first query result page, and generating the candidate alias list based on a first query formula matching the first query result page in the first type of query behavior-associated log, in a review application, screening out a second type of query behavior-associated log of purchasing a service item corresponding to the target POI selected by the user in a second query result page, and generating the candidate alias list based on a second query formula matching the second query result page in the second type of query behavior-associated log; and in a taxi application, screening out a third type of query behavior-associated log of taking a taxi to the target POI selected by the user in a third query result page, and generating the candidate alias list based on a third query formula matching the third query result page in the third type of query behavior-associated log.

S220, acquiring, by a preset word vector model, word vectors of a standard name of the target POI and candidate aliases in the candidate alias list.

Here, the word vector model is used to determine the word vector of a name. Specifically, the word vector model may be a collection of word vectors, or may be a machine learning model that is pre-trained to calculate a word vector of a text, such as a continuous bag-of-words (CBOW) model or vector space models (VSMs).

When the word vector model is a collection of word vectors, alternatively, before acquiring, by a preset word vector model, word vectors of a standard name of the target POI and candidate aliases in the candidate alias list, the method further includes: generating a text corpus based on review data and/or retrieval data matching the target POI; performing word segmentation processing on a document included in the text corpus using a word segmentation dictionary, to obtain a plurality of segmented words, where the word segmentation dictionary includes: the standard name of the target POI and the candidate aliases included in the candidate alias list; and calculating, according to a preset word vector calculation method, word vectors of the segmented words as the word vector model.

Here, the review data may be data that commenting on the POI. As an example, the POI is a restaurant, and the review data includes a service quality evaluation for the POI. The retrieval data may be data related to query directing at the POI. As an example, the POI is a restaurant, and the retrieval data includes a retrieval directing at a menu included in the POI. It may be understood that the review data usually includes a name of the POI (standard name or alias) and review data for the POI; the retrieval data usually includes a name of the POI (standard name or alias) and query data directing at the POI. The text corpus is used to store association data containing POI names. Here, the POIs are stored in documents, and different POIs correspond to different documents.

The word segmentation dictionary is used for word segmentation. Specifically, a target string is screened out from a to-be-segmented text to match with the words in the word segmentation dictionary. If a string identical with the target string is queried from the word segmentation dictionary, the target string may be segmented from the to-be-segmented text, and target strings are continuously screened in the remaining text for being queried in the word segmentation dictionary.

Here, the preset word vector calculation method is used to calculate the word vectors of segmented words, and may include a statistics-based method or a language model based method. Calculating the word vectors of segmented words in the text corpus is actually using a word embedding method based on the text corpus, implementing all the segmented words in the text corpus to obtain corresponding word vectors. Thus, a obtained word vector may be used to describe a relationship between the segmented word and other segmented word in the text corpus. At the same time, the segmented words include the standard name and candidate alias of the POI, so that the word vectors calculated based on the text corpus may accurately describe the relationship between the standard name and the candidate alias.

By acquiring the review data and/or the retrieval data of the POI, and using the word segmentation method to acquire the standard name and at least one candidate alias of the POI, the names of the POI are gathered from massive network data. In addition, the word vector calculation method is used to respectively calculate the word vectors of the respective segmented words in the text corpus to indicate the relationship between the segmented words, for subsequent accurate determination of the relationship between the standard name and the candidate alias.

Here, alternatively, the generating a text corpus based on review data and/or retrieval data matching the target POI includes at least one of the following: in a review website, acquiring a review page of the target POI, and composing comment data included in the review page into a document, to generate the text corpus; combining the first query formula in the first type of query behavior-associated log with the target POI into a document to generate the text corpus; combining the second query formula in the second type of query behavior-associated log with the target POI into a document to generate the text corpus; and combining the third query formula in the third type of query behavior-associated log with the target POI into a document to generate the text corpus.

Specifically, the review data may be acquired from the review website, and specifically may include determining a review page including the POI and acquiring review data corresponding to the POI from the review page, thereby generating a document including the POI and the corresponding review data, and added to the text corpus.

The retrieval data may be acquired from the user query data recorded by the application providing LBS. Here, the application providing LBS may include at least one of the following: an application such as the aforementioned map application, review application, and taxi application. The query formula and POI input by the user are acquired and combined into a document, and the document including the POI and the corresponding query formula is generated and added to the text corpus.

By acquiring the POI and the corresponding data, and generating a document, it is guaranteed that the document includes at least the POI and relevant data corresponding to the POI, and the document is added to the text corpus, thereby implementing the text corpus including POI-related data. Thus, when word vectors are subsequently calculated based on the segmented words in the text corpus, the word vectors used to describe the relationship between the standard name and the candidate alias of the POI may be accurately calculated.

S230, calculating vector similarities between the standard name of the target POI and the candidate aliases.

A vector similarity is calculated based on the word vectors of the standard name and the word vector of a corresponding candidate alias. The specific calculation method may be to calculate the cosine of the angle between the two word vectors.

S240, screening out the at least one target alias in the candidate alias list based on vector similarity calculation results.

As an example, the screening method may be that determining a candidate alias having a vector similarity calculation result exceeding a preset threshold as the target alias.

Figure 2B:
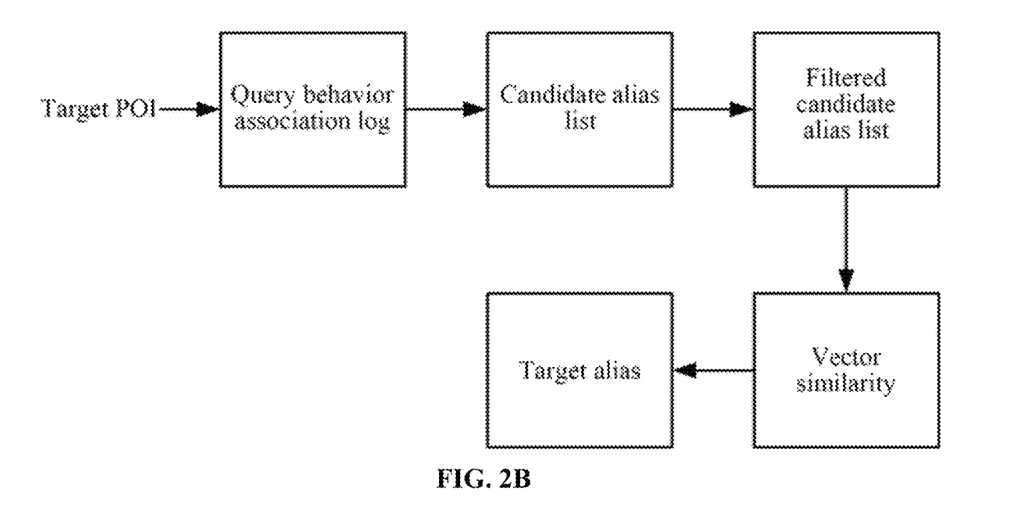
FIG. 2B is a schematic diagram of an application scenario applied in Embodiment 2 of the present disclosure.

In a specific example, as shown in FIG. 2B, the query behavior-associated log is acquired based on the target POI, thereby screening the candidate alias list, and filtering is performed according to a preset rule to obtain a filtered candidate alias list. The target alias is selected based on the vector similarities between the word vectors of candidate aliases in the filtered candidate alias list and the word vector of the standard name of the target POI.

The embodiment of the present disclosure, by acquiring the word vector of the standard name of the target POI and the word vectors of the candidate aliases, and calculating the vector similarities between the standard name and candidate aliases, accurately describe the relationship between the standard name and each candidate alias. At the same time, based on the vector similarities, the relationships between the standard name and candidate aliases are measured, the relationships between the standard name and candidate aliases are accurately described, and the target alias is selected based on the relationships, implementing accurately selecting the alias.

Embodiment 3

Figure 3A:
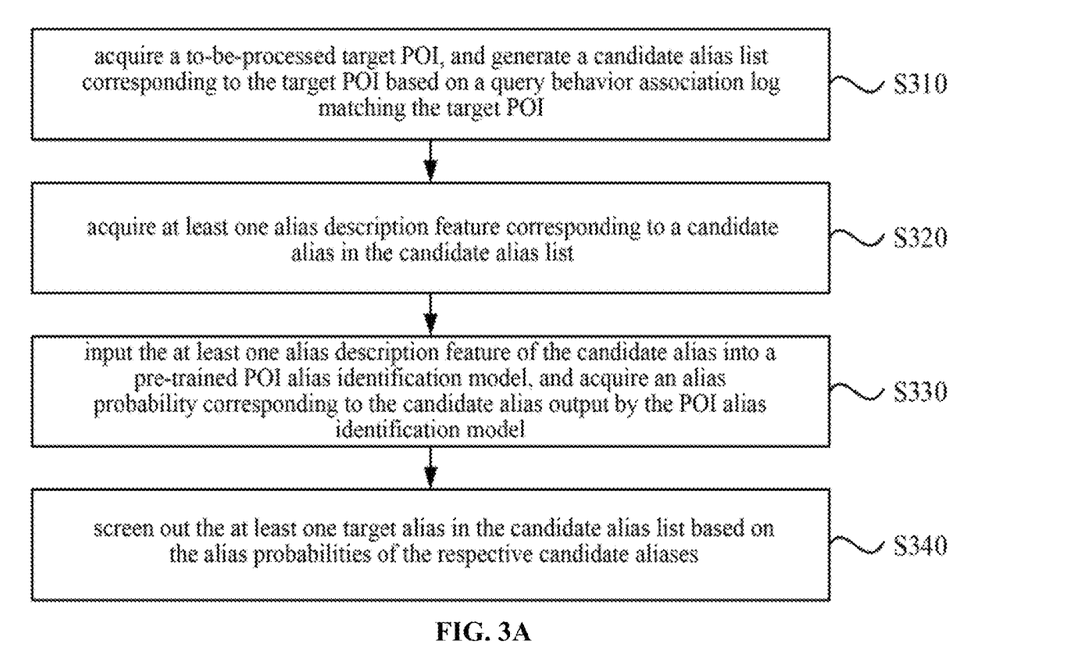
FIG. 3A is a flowchart of a method for determining a POI alias according to Embodiment 3 of the present disclosure.

FIG. 3A is a flowchart of a method for determining a POI alias in Embodiment 3 of the present disclosure. The present embodiment is further embodied on the basis of the foregoing embodiments, and the screening out at least one target alias corresponding to the target POI in the candidate alias list, based on association relationships between candidate aliases in the candidate alias list and the target POI, is embodied as: acquiring at least one alias description feature corresponding to a candidate alias in the candidate alias list; inputting the at least one alias description feature of the candidate alias into a pre-trained POI alias identification model, and acquiring an alias probability corresponding to the candidate alias output by the POI alias identification model; and screening out the at least one target alias in the candidate alias list based on the alias probabilities of candidate aliases. The method specifically includes:

S310, acquiring a to-be-processed target POI, and generating a candidate alias list corresponding to the target POI based on a query behavior-associated log matching the target POI.

For details of the target POI, the query behavior-associated log, the association relationship, the standard name, and the target alias in the present embodiment, reference may be made to the description of the foregoing embodiment.

S320, acquiring at least one alias description feature corresponding to each candidate alias in the candidate alias list.

Here, the alias description feature is used to determine the relationship with the standard name.

Alternatively, the alias description feature includes at least one of the following: a vector similarity between a standard alias and a corresponding standard name, a word frequencies of a standard alias and a corresponding standard name in a setting corpus, a Chinese editing distance between a standard alias and a corresponding standard name, an English editing distance between a standard alias and a corresponding standard name, a Chinese and English abbreviations editing distanced between a standard alias and a corresponding standard name, a brand name editing distance between a standard alias and a corresponding standard name, heat of a corresponding standard sample POI, a function area feature of a corresponding standard sample POI, a type of a peripheral POI of a corresponding standard sample POI, and peripheral POI density of a corresponding standard sample POI.

Here, the standard alias may refer to a verified alias of the target POI.

The vector similarity between a standard alias and a corresponding standard name is used to indicate a degree of similarity between the standard alias and the standard name.

The word frequencies of a standard alias and a word frequency of a corresponding standard name in a set corpus are used to indicate the frequency of the standard alias occurring in the set corpus and the frequency of the standard name occurring in the set corpus.

The editing distance may be the number of minimum edit operations required to convert from one string to another between two strings.

The Chinese editing distance between a standard alias and a corresponding standard name is used to indicate a degree of similarity between the Chinese standard alias and the corresponding Chinese standard name.

The English editing distance between a standard alias and a corresponding standard name is used to indicate a degree of similarity between the English standard alias and the corresponding English standard name.

The Chinese and English abbreviations editing distances between a standard alias and a corresponding standard name is used to indicate a degrees of similarities between the Chinese and English abbreviated standard aliases and the corresponding Chinese and English abbreviated standard names.

The brand name editing distance between a standard alias and a corresponding standard name is used to indicate a degree of similarity between the standard alias and the brand name corresponding to the standard name.

The heat of a corresponding standard sample POI is used to indicate the usage rate of the standard alias corresponding to the standard sample POI, for example, the number of being searched and/or the number of being queried.

In addition, the POI may also be used to represent a function area, a place having a large area coverage such as a business district, a plaza, a college, a residential area, or a science park. The POI function area usually includes a plurality of places. As an example, a science and technology park POI includes office buildings, corporate businesses, parking lots, transportation facilities, etc.

The function area feature of a corresponding standard sample POI is used to indicate quantitative characteristics (such as the number of shops included) and/or attribute characteristics (such as the type of place included) and the like, of the standard sample POI representing the function area.

The type of a peripheral POI of a corresponding standard sample POI is used to indicate a POI type in the vicinity of the standard sample POI. As an example, the POI type includes commercial institution, tourist attraction, transportation site, or infrastructure (such as hospital).

The peripheral POI density of a corresponding standard sample POI is used to indicate a density degree of POIs in the vicinity of the standard sample POI.

By pre-setting a plurality of description features, the characteristics of an alias may be accurately described, and the representativeness of the description features may be improved, thereby improving the discrimination accuracy of the POI alias identification model.

S330, inputting the at least one alias description feature of the candidate alias into a pre-trained POI alias identification model, and acquiring an alias probability corresponding to the candidate alias output by the POI alias identification model.

Here, the alias probability is used to evaluate the probability value of a candidate alias of the POI being a POI alias, for example, 80% or 90%, and the like.

The POI alias identification model is a pre-trained machine learning model for calculating the alias probability of the candidate alias being the POI alias. Specifically, the machine learning model may include models such as support vector machines, logistic regression, decision trees, gradient boosting trees, or neural networks.

S340, screening out the at least one target alias in the candidate alias list based on the alias probabilities of the respective candidate aliases.

Specifically, the target alias may be screened out by a preset alias threshold condition. The alias threshold condition is used to determine whether the candidate alias is an alias of the POI, for example, the alias threshold condition defines a specific threshold, for example, 70% or 80%, and the like.

On the basis of the foregoing embodiments, alternatively, before acquiring at least one alias description feature corresponding to the candidate aliases in the candidate alias list, the method further includes: acquiring at least one standard sample data, the standard sample data including: a standard name of a standard sample POI, and a standard alias corresponding to the standard sample POI; acquiring at least one alias description feature respectively corresponding to the standard aliases in the respective standard sample data; and inputting the at least one alias description feature respectively corresponding to the standard alias in the respective sample data into a standard machine learning model, to train the standard machine learning model to obtain the POI alias identification model.

Specifically, based on the standard name of the POI, and the standard sample POI constructed by the corresponding standard alias, and using at least one POI description feature of the standard sample POI as training samples, train the standard machine learning model to obtain the POI alias identification model. By using the at least one POI description feature corresponding to the standard sample POI constructed by the standard name and the standard alias as the training samples, the POI alias identification model is obtained by training, to improve the calculation accuracy of the POI alias identification model.

It should be noted that, in addition to the standard sample POI, a randomly generated negative sample including the target POI and an alias not related to the target POI may be constructed as a training sample to train the model.

Here, acquiring at least one standard sample data may be marking data in the manner of PGC to obtain a standard name and a corresponding standard alias for constructing the standard sample data. Alternatively, the standard sample data may be constructed base on the user's query behavior data.

Alternatively, the acquiring at least one standard sample data, includes: generating a plurality of sample group data based on query behavior-associated logs corresponding to a location service application, where the sample group includes: a user query formula, a user clicked POI, and a user actually visited POI; screening out, in the sample group data, a target sample group in which a user query formula is different from a user clicked POI and the user clicked POI is identical with a user actually visited POI; constructing candidate sample data with the user query formula included in the target sample group as a candidate alias and a standard name of the user clicked POI as a standard name of a candidate sample POI; acquiring word vectors of candidate alias and the candidate sample POI in a the candidate sample data, and calculating a vector similarity between the candidate alias and the standard name of the corresponding candidate sample POI; and screening out the standard sample data in the candidate sample data based on the vector similarities corresponding to the respective candidate sample data.

Here, the sample group data is used to represent data of a sample group. The sample group data includes data of a plurality of sample groups. Each sample group includes data such as a user query formula, a user clicked POI, and a user actually visited POI. The user query formula is used to indicate a query text directing at the POI and input by the user. The user clicked POI is used to indicate a result selected by the user from the query results directing at the POI. The user actually visited POI is used to indicate a POI where the user performs an operation. As an example, in a taxi application, the user inputs a taxi destination, the user query formula POI is KFC, the user clicked POI is Kentucky Fried Chicken, and the user actually visited POI is the destination Kentucky Fried Chicken visited by the user. It may be understood that when the user inputs the alias of the POI, the case of that the text input by the user is different from the name of the POI in the query result clicked by the user while the name of the POI in the query result is identical with the name of the POI finally implemented by the user. That is, the user query formula is different from the user clicked POI, and the user clicked POI is identical with the user actually visited POI. Therefore, based on the condition that the user query formula is different from the user clicked POI and the user clicked POI is identical with the user actually visited POI, it may be determined that the user query formula is used as a candidate alias, and the user clicked POI is used as a candidate sample POI, to construct the candidate sample data.

In order to ensure the representativeness of the candidate sample data, the standard sample data may be screened out by calculating the vector similarity between the word vector of the candidate alias and the word vector of the corresponding standard name.

By generating a plurality of sample group data based on the query behavior-associated logs, and screening out a target sample group in which a user query formula is different from a user clicked POI and the user clicked POI is identical with a user actually visited POI, constructing candidate sample data, at the same time, calculating the vector similarity between the word vector of the candidate alias and the word vector of the corresponding standard name in the candidate sample data, standard sample data is screened out, which improves the representativeness of the standard sample data, thereby improving the calculation accuracy of the POI alias identification model.

In a specific example, for a POI, acquiring that a large number of users search a query (user query formula), click on the POI, and visit the POI offline. Thus, sample groups <$User_i, Query_i, CPOI_i, APOI_i$> may be constructed. Here, $CPOI_i$ is used to describe that the user performs a click operation on the application that provides the LBS, and $APOI_i$ is used to describe that the user actually arrives at the POI determined through operational data such as user positioning or payment. When a sample group satisfies the following condition: $Query_i !=name(CPOI_i)$, $name(CPOI_i)=name(APOI_i)$, where name( ) function indicates taking the standard name of the corresponding POI, and the vector similarity of <$Query_i, POI_i$> exceeds a set threshold, <$Query_i, POI_i$> is used as the standard sample data for training the model.

Figure 3B:
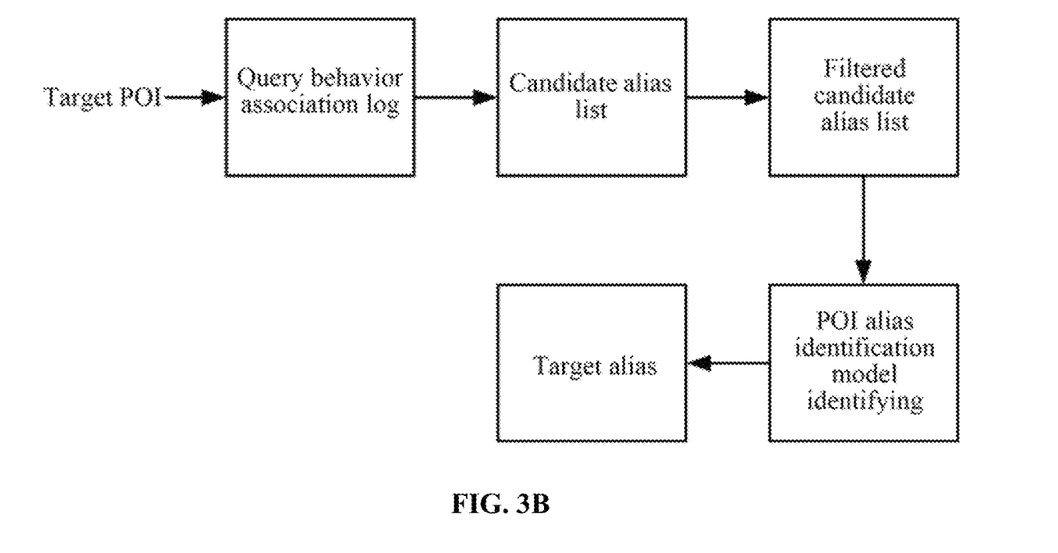
FIG. 3B is a schematic diagram of an application scenario applied in Embodiment 3 of the present disclosure.

In a specific example, as shown in FIG. 3B, the query behavior-associated log is acquired based on the target POI, thereby screening the candidate alias list, and filtering is performed based on a preset rule to obtain a filtered candidate alias list. At least one alias description feature of each candidate alias in the filtered candidate alias list is input into a POI alias identification model, to obtain the alias probability of each candidate alias output by the POI alias identification model, an the target alias is screened based on the alias probability of each candidate alias.

In the embodiment of the present disclosure, the POI alias identification model is used for determining a candidate alias of the POI based on the description feature of the candidate alias, thereby the accuracy of determining a POI alias is improved, the labor cost is reduced, and the efficiency of determining a POI alias is improved.

Embodiment 4

Figure 4:
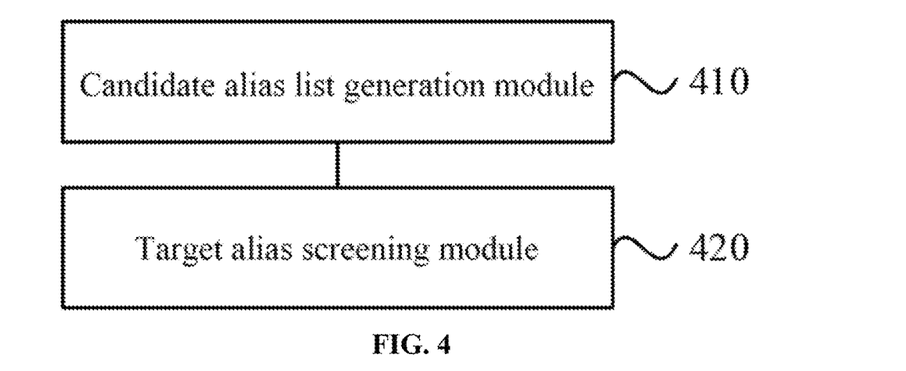
FIG. 4 is a schematic structural diagram of an apparatus for determining a POI alias according to Embodiment 4 of the present disclosure.

FIG. 4 is a schematic structural diagram of an apparatus for determining a POI alias in Embodiment 4 of the present disclosure. As shown in FIG. 4, the apparatus specifically includes:

a candidate alias list generation module 410, configured to acquire a to-be-processed target POI, and generate a candidate alias list corresponding to the target POI based on a query behavior-associated log matching the target POI; and a target alias screening module 420, configured to screen out at least one target alias corresponding to the target POI in the candidate alias list, based on association relationships between candidate aliases in the candidate alias list and the target POI.

The embodiments of the present disclosure acquire the query behavior-associated log matching the target POI, the query behavior-associated log including query data directing at the target POI. With the popularity of the Internet, a large amount of query data of network users directing at the target POI may be acquired. On this basis, the candidate alias list is generated based on the query behavior-associated log, and the coverage rate of the candidate aliases is greatly improved. At the same time, at least one target alias corresponding to the target POI is screened out based on the association relationships between candidate aliases and the target POI, implementing accurately determining a POI alias, solving the problems of low efficiency, low accuracy, high cost and low coverage rate of POI alias generation in the prior art, which may improve the coverage rate of the POI candidate aliases. At the same time, screening from a large number of POI candidate aliases may improve the probability of the target alias in the candidate alias list, thereby improving the accuracy of determining an alias, and avoiding the manual generation of a POI alias, improving the efficiency of determining a POI alias, and reducing the cost of determining a POI alias.

Further, the candidate alias list generation module 410 is specifically configured to at least one of the following: in a map application, screen out a first type of query behavior-associated log of navigating to the target POI selected by a user in a first query result page, and generate the candidate alias list based on a first query formula matching the first query result page in the first type of query behavior-associated log; in a review application, screen out a second type of query behavior-associated log of purchasing a service item corresponding to the target POI selected by a user in a second query result page, and generate the candidate alias list based on a second query formula matching the second query result page in the second type of query behavior-associated log; and in a taxi application, screen out a third type of query behavior-associated log taking a taxi to the target POI selected by the user in a third query result page, and generate the candidate alias list based on a third query formula matching the third query result page in the third type of query behavior-associated log.

Further, the apparatus for determining a POI alias may specifically include: a candidate alias screening unit, configured to, before screening out at least one target alias corresponding to the target POI in the candidate alias list, eliminate a candidate alias consistent with a standard name of the target POI from the candidate alias list, and/or eliminate a candidate alias with an occurrence number less than a set number threshold in the query behavior-associated log from the candidate alias list.

Further, the target alias screening module 420 is specifically configured to: acquire, by a preset word vector model, word vectors of a standard name of the target POI and candidate aliases in the candidate alias list; calculate vector similarities between the standard name of the target POI and the candidate aliases; and screen the at least one target alias in the candidate alias list based on vector similarity calculation results.

Further, the apparatus for determining a POI alias may specifically include: a text corpus generation unit, configured to, before acquiring, by a preset word vector model, word vectors of a standard name of the target POI and candidate aliases in the candidate alias list, generate a text corpus based on review data and/or retrieval data matching the target POI; a word segmentation processing unit, configured to perform word segmentation processing on a document included in the text corpus using a word segmentation dictionary, to obtain a plurality of segmented words, where the word segmentation dictionary includes: the standard name of the target POI and the candidate aliases included in the candidate alias list; and a word vector calculation unit, configured to calculate, according to a preset word vector calculation method, word vectors of the segmented words as the word vector model.

Further, the text corpus generation unit is specifically configured to at least one of the following: in a review website, acquire a review page of the target POI, and compose comment data included in the review page into a document to generate the text corpus; combine the first query formula in the first type of query behavior-associated log with the target POI into a document to generate the text corpus; combine the second query formula in the second type of query behavior-associated log with the target POI into a document to generate the text corpus; and combine the third query formula in the third type of query behavior-associated log with the target POI into a document to generate the text corpus.

Further, the target alias screening module 420 is specifically configured to: acquire at least one alias description feature corresponding to a candidate alias in the candidate alias list; input the at least one alias description feature of the candidate alias into a pre-trained POI alias identification model, and acquire an alias probability corresponding to the candidate alias output by the POI alias identification model; and screen out the at least one target alias in the candidate alias list based on alias probabilities of the candidate aliases.

Further, the apparatus for determining a POI alias may specifically include: a standard sample data acquisition unit, configured to, before acquiring at least one alias description feature corresponding to a candidate alias in the candidate alias list, acquire at least one piece of standard sample data, a piece of standard sample data including: a standard name of a standard sample POI, and a standard alias corresponding to the standard sample POI; an alias description feature acquisition unit, configured to acquire at least one alias description feature respectively corresponding to the standard aliases in the respective pieces of standard sample data; and a POI alias identification model training unit, configured to input the at least one alias description feature respectively corresponding to the standard aliases in the respective pieces of sample data into a standard machine learning model, to train the standard machine learning model to obtain the POI alias identification model.

Further, the alias description feature includes at least one of the following: a vector similarity between a standard alias and a corresponding standard name, word frequencies of the standard alias and the corresponding standard name in a setting corpus, a Chinese editing distance between the standard alias and the corresponding standard name, an English editing distance between a standard alias and a corresponding standard name, a Chinese and English abbreviations editing distances between a standard alias and a corresponding standard name, a brand name editing distance of a standard alias and a corresponding standard name, heat of a corresponding standard sample POI, a function area feature of a corresponding standard sample POI, a type of a peripheral POI of a corresponding standard sample POI, and peripheral POI density of a corresponding standard sample POI.

Further, the standard sample data acquisition unit is specifically configured to: generate a plurality of sample group data based on a query behavior-associated logs corresponding to a location service application, where a sample group includes: a user query formula, a user clicked POI, and a user actually visited POI; screen out, in the sample group data, a target sample group, a user query formula thereof being different from a user clicked POI thereof, and the user clicked POI thereof being identical with a user actually visited POI thereof; construct a piece of candidate sample data with the user query formula included in the target sample group as a candidate alias and a standard name of the user clicked POI as a standard name of a candidate sample POI; acquire word vectors of a candidate alias and the candidate sample POI of a piece of candidate sample data, and calculate a vector similarity between the candidate alias and the standard name of the corresponding candidate sample POI; and screen out the standard sample data in the candidate sample data based on the vector similarity corresponding to respective pieces the candidate sample data.

The above apparatus for determining a POI alias may perform the method for determining a POI alias provided by of the embodiments of the present disclosure, and has the corresponding functional modules and beneficial effects for performing the method for determining a POI alias.

Embodiment 5

Figure 5:
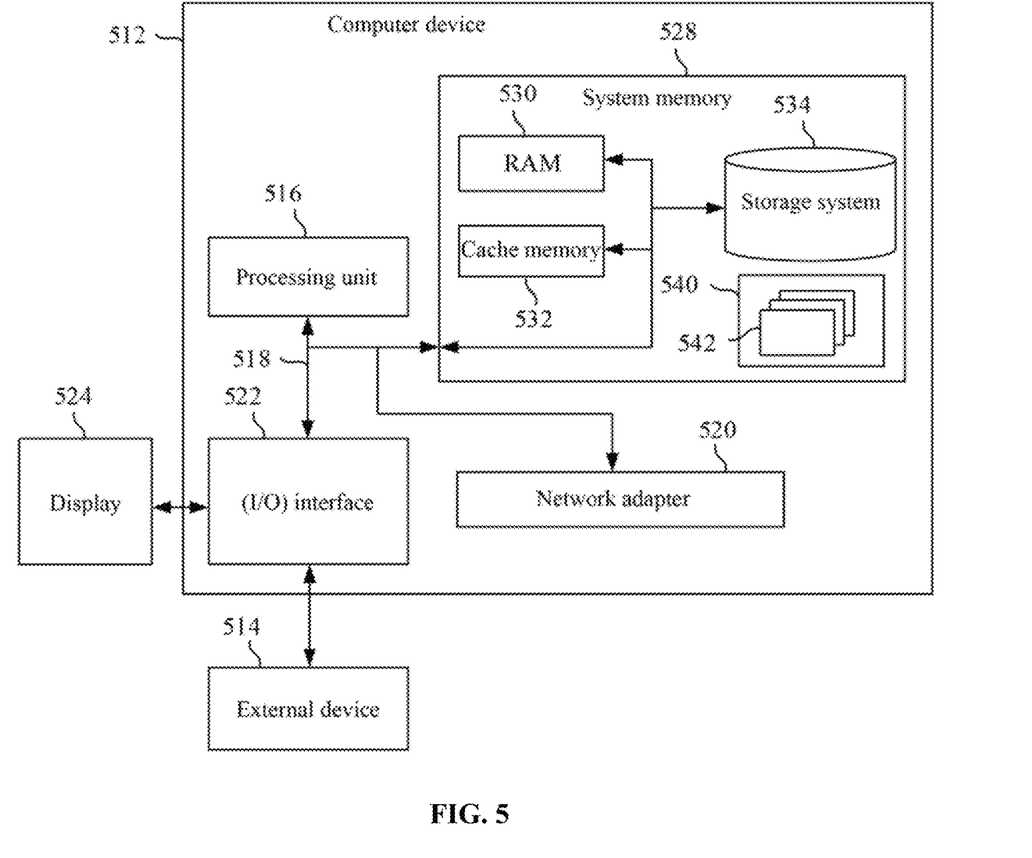
FIG. 5 is a schematic structural diagram of a computer device according to Embodiment 5 of the present disclosure.

FIG. 5 is a schematic structural diagram of a computer device provided in Embodiment 5 of the present disclosure. FIG. 5 illustrates a block diagram of an example computer device 512 suitable for implementing the embodiments of the present disclosure. The computer device 512 shown in FIG. 5 is merely an example and should not impose any limitation on the function and scope of use of the embodiments of the present disclosure.

As shown in FIG. 5, the computer device 512 is embodied in the form of a general-purpose computing device. Components of the computer device 512 may include, but are not limited to: one or more processors or a processing unit 516, a system memory 528, and a bus 518 that connects various system components (including the system memory 528 and the processing unit 516). The computer device 512 may be a vehicle-mounted device.

The bus 518 indicates one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (ISA) bus, a Micro Channel Architecture (MCA) bus, an enhanced ISA bus, a Video Electronics Standards Association (VESA) local bus and a Peripheral Component Interconnect (PCI) bus.

The computer device 512 typically includes a variety of computer system readable mediums. These mediums may be any available medium that can be accessed by the computer device 512, including volatile and non-volatile medium, removable and non-removable medium.

The system memory 528 may include computer system readable medium in the form of volatile memory, such as random access memory (RAM) 530 and/or cache memory 532. The computer device 512 may further include other removable/non-removable, volatile/non-volatile computer system storage medium. By way of example only, a storage system 534 may be used to read and write non-removable, non-volatile magnetic medium (not shown in FIG. 5, commonly referred to as a "hard disk drive"). Although not shown in FIG. 5, a disk drive for reading and writing to a removable non-volatile disk (such as a "floppy disk"), and an optical drive for reading and writing to a removable non-volatile disk (such as a compact disk read-only memory (CD-ROM), a digital video disc-read only memory (DVD-ROM) or other optical medium may be provided. In these cases, each drive may be coupled to the bus 518 via one or more data medium interfaces. The memory 528 may include at least one program product having a set (e.g., at least one) of program modules configured to perform the functions of the various embodiments of the present disclosure.

A program/utility 540 having a set (at least one) of program modules 542, may be stored, for example, in the memory 528, such program modules 542 include, but are not limited to, operating systems, one or more applications, other program modules and program data, each of these examples or some combination thereof may include an implementation of a network environment. The program module 542 typically performs the functions and/or methods of the embodiments described by the present disclosure.

The computer device 512 may also be in communication with one or more external devices 514 (e.g., a keyboard, pointing device, display 524, etc.), and may also be in communication with one or more devices that enable a user to interact with the computer device 512, and/or any device (e.g., a network card, modem, etc.) that enables the computer device 512 to communicate with one or more other computing devices. This communication may take place via an input/output (I/O) interface 522. Moreover, the computer device 512 may also communicate with one or more networks (such as a local area network (LAN), a wide area network (WAN)) through a network adapter 520. As shown in the figure, the network adapter 520 communicates with other modules of the computer device 512 via the bus 518. It should be understood that although not shown in FIG. 5, other hardware and/or software modules may be used in conjunction with the computer device 512, including but not limited to: microcode, device drivers, redundant processing units, external disk drive arrays, redundant arrays of inexpensive disks (RAID) systems, tape drives, and data backup storage systems.

The processing unit 516 performs various function applications and data processing by running a program stored in the system memory 528, for example, a method for determining a POI alias provided by an embodiment of the present disclosure.

Embodiment 6

The Embodiment 6 of the present disclosure further provides a computer readable storage medium, storing a computer program thereon, the program, when executed by a processor, implements the method for determining a POI alias according to any of the embodiments of the present disclosure: acquiring a to-be-processed target POI, and generating a candidate alias list corresponding to the target POI based on a query behavior-associated log matching the target POI; and screening out at least one target alias corresponding to the target POI in the candidate alias list, based on association relationships between candidate aliases in the candidate alias list and the target POI.

The computer storage medium of the embodiments of the present disclosure may use any combination of one or more computer readable mediums. The computer readable medium may be a computer readable signal medium or a computer readable storage medium. The computer readable storage medium may be, for example, but not limited to, electric, magnetic, optical, electromagnetic, infrared, or semiconductor systems, apparatus, elements, or a combination of any of the above. A more specific example (non-exhaustive list) of the computer readable storage medium may include but is not limited to: electrical connection with one or more wires, a portable computer disk, a hard disk, a RAM, a read only memory (ROM), an erasable programmable read only memory (EPROM), a flash memory, a fiber, a portable CD-ROM, an optical memory, a magnet memory or any suitable combination of the above. The computer readable storage medium herein may be any tangible medium containing or storing programs which may be used by a command execution system, apparatus or element or incorporated thereto.

The computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element.

The program codes contained on the computer readable medium may be transmitted with any suitable medium including but not limited to: wireless, wired, optical cable, radiofrequency (RF) etc., or any suitable combination of the above.

A computer program code for performing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including LAN or WAN, or may be connected to an external computer (for example, connected through Internet using an Internet service provider).

It should be noted that the above are only the preferred embodiments of the present disclosure and the technical principles applied. It should be appreciated by those skilled in the art that the present disclosure is not limited to the specific embodiments described herein, and that various modifications, changes and substitutions may be made without departing from the scope of the present disclosure. Although the present disclosure has been described in detail through the above embodiments, the present disclosure is not limited to the above embodiments, other equivalent embodiments may be included without departing from the inventive concept, and the scope of the disclosure is determined by the scope of the appended claims.

What is claimed is:

1. A method for determining a point of interest (POI) alias, the method comprising:
   acquiring a target POI that is to be processed, and generating a candidate alias list corresponding to the target POI based on a query behavior-associated log, the query behavior-associated log being used for recording data of query behavior directing at the target POI by a network user in an application providing location-based services (LBS), matching the target POI; and
   screening out at least one target alias corresponding to the target POI in the candidate alias list, based on association relationships between candidate aliases in the candidate alias list and the target POI,
   wherein before screening out at least one target alias corresponding to the target POI in the candidate alias list, the method further comprises:
   extracting a sequence comprising at least one candidate alias and a standard name of the target POI from the query behavior-associated log, and building at least one alias-name pair from the sequence, the alias-name pair comprising a candidate alias and the standard name; and
   eliminating a candidate alias consistent with the standard name of the target POI from the candidate alias list; or eliminating a candidate alias from the candidate alias list in response to a number of the alias-name pair of the candidate alias being less than a set number threshold, and
   wherein the screening out at least one target alias corresponding to the target POI in the candidate alias list, according to association relationships between candidate aliases in the candidate alias list and the target POI, comprises:
   acquiring at least one alias description feature corresponding to a candidate alias in the candidate alias list;
   inputting the at least one alias description feature of the candidate alias into a pre-trained POI alias identification model, and acquiring an alias probability corresponding to the candidate alias output by the POI alias identification model; and
   screening out the at least one target alias in the candidate alias list based on alias probabilities of the candidate aliases,
   the pre-trained POI alias identification model being trained based on at least one piece of standard sample data obtained by:
   based on query behavior-associated logs corresponding to a location service application, extracting a piece of sample group data comprising a user query formula, a user clicked POI, and a user actually visited POI for each query behavior-associated log, to obtain a plurality of pieces of sample group data corresponding to the query behavior-associated logs;

for each piece of sample group data, determining whether a user query formula thereof is different from a user clicked POI thereof and the user clicked POI thereof is identical with a user actually visited POI thereof, and determining the piece of piece target sample group to be a sample group in response to the user query formula thereof being different from a user clicked POI thereof and the user clicked POI thereof being identical with a user actually visited POI thereof;

constructing a piece of candidate sample data with the user query formula comprised in the target sample group as a candidate alias and a standard name of the user clicked POI as a standard name of a candidate sample POI;

acquiring word vectors of a candidate alias and the candidate sample POI of a piece of candidate sample data, and calculating a vector similarity between the candidate alias and the standard name of the corresponding candidate sample POI; and screening out the standard sample data in the candidate sample data based on the vector similarities corresponding to respective pieces the candidate sample data.

2. The method according to claim 1, wherein the generating a candidate alias list corresponding to the target POI based on a query behavior-associated log matching the target POI comprises at least one of:

in a map application, determining, from the query behavior-associated log, a first behavior log of navigating to the target POI selected by a user in a first query result page, and generating the candidate alias list based on a first query formula matching the first query result page in the first behavior log;

in a review application, determining, from the query behavior-associated log, a second behavior log of purchasing a service item corresponding to the target POI selected by a user in a second query result page, and generating the candidate alias list based on a second query formula matching the second query result page in the second behavior log; and in a taxi application, determining, from the query behavior-associated log, a third behavior log of taking a taxi to the target POI selected by a user in a third query result page, and generating the candidate alias list based on a third query formula matching the third query result page in the third behavior log.

3. The method according to claim 2, wherein the screening out at least one target alias corresponding to the target POI in the candidate alias list, according to association relationships between candidate aliases in the candidate alias list and the target POI, comprises:

acquiring, by a preset word vector model, word vectors of a standard name of the target POI and the candidate aliases in the candidate alias list;

calculating vector similarities between the standard name of the target POI and the respective candidate aliases; and screening out the at least one target alias in the candidate alias list based on vector similarity calculation results.

4. The method according to claim 3, wherein before acquiring, by a preset word vector model, word vectors of a standard name of the target POI and the candidate aliases in the candidate alias list, the method further comprises:

generating a text corpus based on at least one of review data or retrieval data matching the target POI;

performing word segmentation processing on a document comprised in the text corpus using a word segmentation dictionary, to obtain a plurality of segmented words, wherein the word segmentation dictionary comprises: the standard name of the target POI and the candidate aliases comprised in the candidate alias list; and calculating, according to a preset word vector calculation method, word vectors of the segmented words as the word vector model.

5. The method according to claim 4, wherein the generating a text corpus based on at least one of review data or retrieval data matching the target POI comprises at least one of:

in a review web site, acquiring a review page of the target POI, and composing comment data comprised in the review page into a document to generate the text corpus;

combining the first query formula in the first behavior log with the target POI into a document to generate the text corpus;

combining the second query formula in the second behavior log with the target POI into a document to generate the text corpus; and combining the third query formula in the third behavior log with the target POI into a document to generate the text corpus.

6. The method according to claim 1, wherein before acquiring at least one alias description feature corresponding to a candidate alias in the candidate alias list, the method further comprises:

acquiring at least one alias description feature respectively corresponding to the standard aliases in the respective pieces of standard sample data; and inputting the at least one alias description feature respectively corresponding to the standard aliases in the respective pieces of sample data into a standard machine learning model, to train the standard machine learning model to obtain the POI alias identification model.

7. The method according to claim 6, wherein the alias description feature comprises at least one of:

a vector similarity between a standard alias and a corresponding standard name, word frequencies of the standard alias and the corresponding standard name in a setting corpus, a Chinese editing distance between the standard alias and the corresponding standard name, an English editing distance between the standard alias and the corresponding standard name, Chinese and English abbreviations editing distances between the standard alias and the corresponding standard name, a brand name editing distance between the standard alias and the corresponding standard name, heat of a corresponding standard sample POI, a function area feature of a corresponding standard sample POI, a type of a peripheral POI of a corresponding standard sample POI, and peripheral POI density of a corresponding standard sample POI.

8. An apparatus for determining a point of interest (POI) alias, the apparatus comprising:

at least one processor; and a memory storing instructions, the instructions when executed by the at least one processor, causing the at least one processor to perform operations, the operations comprising:

acquiring a target POI that is to be processed, and generating a candidate alias list corresponding to the target POI based on a query behavior-associated log, the query behavior-associated log being used for recording data of query behavior directing at the target POI by a network user in an application providing location-based services (LBS), matching the target POI; and screening out at least one target alias corresponding to the target POI in the candidate alias list, based on association relationships between candidate aliases in the candidate alias list and the target POI, wherein before screening out at least one target alias corresponding to the target POI in the candidate alias list, the operations further comprise:

extracting a sequence comprising at least one candidate alias and a standard name of the target POI from the query behavior-associated log, and building at least one alias-name pair from the sequence, the alias-name pair comprising a candidate alias and the standard name; and eliminating a candidate alias consistent with the standard name of the target POI from the candidate alias list; or eliminating a candidate alias from the candidate alias list in response to a number of the alias-name pair of the candidate alias being less than a set number threshold, and wherein the screening out at least one target alias corresponding to the target POI in the candidate alias list, according to association relationships between candidate aliases in the candidate alias list and the target POI, comprises:

acquiring at least one alias description feature corresponding to a candidate alias in the candidate alias list;

inputting the at least one alias description feature of the candidate alias into a pre-trained POI alias identification model, and acquiring an alias probability corresponding to the candidate alias output by the POI alias identification model; and screening out the at least one target alias in the candidate alias list based on alias probabilities of the candidate aliases, the pre-trained POI alias identification model being trained based on at least one piece of standard sample data obtained by:

based on query behavior-associated logs corresponding to a location service application, extracting a piece of sample group data comprising a user query formula, a user clicked POI, and a user actually visited POI for each query behavior-associated log, to obtain a plurality of pieces of sample group data corresponding to the query behavior-associated logs;

for each piece of sample group data, determining whether a user query formula thereof is different from a user clicked POI thereof and the user clicked POI thereof is identical with a user actually visited POI thereof, and determining the piece of piece target sample group to be a sample group in response to the user query formula thereof being different from a user clicked POI thereof and the user clicked POI thereof being identical with a user actually visited POI thereof;

constructing a piece of candidate sample data with the user query formula comprised in the target sample group as a candidate alias and a standard name of the user clicked POI as a standard name of a candidate sample POI;

acquiring word vectors of a candidate alias and the candidate sample POI of a piece of candidate sample data, and calculating a vector similarity between the candidate alias and the standard name of the corresponding candidate sample POI; and screening out the standard sample data in the candidate sample data based on the vector similarities corresponding to respective pieces the candidate sample data.

9. The apparatus according to claim 8, wherein the generating a candidate alias list corresponding to the target POI based on a query behavior-associated log matching the target POI comprises at least one of:

in a map application, determining, from the query behavior-associated log, a first behavior log of navigating to the target POI selected by a user in a first query result page, and generating the candidate alias list based on a first query formula matching the first query result page in the first behavior log;

in a review application, determining, from the query behavior-associated log, a second behavior log of purchasing a service item corresponding to the target POI selected by a user in a second query result page, and generating the candidate alias list based on a second query formula matching the second query result page in the second behavior log; and in a taxi application, determining, from the query behavior-associated log, a third behavior log of taking a taxi to the target POI selected by a user in a third query result page, and generating the candidate alias list based on a third query formula matching the third query result page in the third behavior log.

10. The apparatus according to claim 9, wherein the screening out at least one target alias corresponding to the target POI in the candidate alias list, according to association relationships between candidate aliases in the candidate alias list and the target POI, comprises:

acquiring, by a preset word vector model, word vectors of a standard name of the target POI and the candidate aliases in the candidate alias list;

calculating vector similarities between the standard name of the target POI and the respective candidate aliases; and screening out the at least one target alias in the candidate alias list based on vector similarity calculation results.

11. The apparatus according to claim 10, wherein before acquiring, by a preset word vector model, word vectors of a standard name of the target POI and the candidate aliases in the candidate alias list, the operations further comprise:

generating a text corpus based on at least one of review data or retrieval data matching the target POI;

performing word segmentation processing on a document comprised in the text corpus using a word segmentation dictionary, to obtain a plurality of segmented words, wherein the word segmentation dictionary comprises: the standard name of the target POI and the candidate aliases comprised in the candidate alias list; and calculating, according to a preset word vector calculation method, word vectors of the segmented words as the word vector model.

12. The apparatus according to claim 11, wherein the generating a text corpus based on at least one of review data or retrieval data matching the target POI comprises at least one of:

in a review web site, acquiring a review page of the target POI, and composing comment data comprised in the review page into a document to generate the text corpus;

combining the first query formula in the first behavior log with the target POI into a document to generate the text corpus;

combining the second query formula in the second behavior log with the target POI into a document to generate the text corpus; and combining the third query formula in the third behavior log with the target POI into a document to generate the text corpus.

13. The apparatus according to claim 8, wherein before acquiring at least one alias description feature corresponding to a candidate alias in the candidate alias list, the operations further comprise:

acquiring at least one alias description feature respectively corresponding to the standard aliases in the respective pieces of standard sample data; and inputting the at least one alias description feature respectively corresponding to the standard aliases in the respective pieces of sample data into a standard machine learning model, to train the standard machine learning model to obtain the POI alias identification model.

14. The apparatus according to claim 13, wherein the alias description feature comprises at least one of:

a vector similarity between a standard alias and a corresponding standard name, word frequencies of the standard alias and the corresponding standard name in a setting corpus, a Chinese editing distance between the standard alias and the corresponding standard name, an English editing distance between the standard alias and the corresponding standard name, Chinese and English abbreviations editing distances between the standard alias and the corresponding standard name, a brand name editing distance between the standard alias and the corresponding standard name, heat of a corresponding standard sample POI, a function area feature of a corresponding standard sample POI, a type of a peripheral POI of a corresponding standard sample POI, and peripheral POI density of a corresponding standard sample POI.

15. A non-transitory storage medium, storing a computer program thereon, wherein the program, when executed by a processor, cause operations to be performed, the operations comprising:

acquiring a target point of interest (POI) that is to be processed, and generating a candidate alias list corresponding to the target POI based on a query behavior-associated log, the query behavior-associated log being used for recording data of query behavior directing at the target POI by a network user in an application providing location-based services (LBS), matching the target POI; and screening out at least one target alias corresponding to the target POI in the candidate alias list, based on association relationships between candidate aliases in the candidate alias list and the target POI, wherein before screening out at least one target alias corresponding to the target POI in the candidate alias list, the operations further comprise:

extracting a sequence comprising at least one candidate alias and a standard name of the target POI from the query behavior-associated log, and building at least one alias-name pair from the sequence, the alias-name pair comprising a candidate alias and the standard name; and eliminating a candidate alias consistent with the standard name of the target POI from the candidate alias list; or eliminating a candidate alias from the candidate alias list in response to a number of the alias-name pair of the candidate alias being less than a set number threshold, and wherein the screening out at least one target alias corresponding to the target POI in the candidate alias list, according to association relationships between candidate aliases in the candidate alias list and the target POI, comprises:

acquiring at least one alias description feature corresponding to a candidate alias in the candidate alias list;

inputting the at least one alias description feature of the candidate alias into a pre-trained POI alias identification model, and acquiring an alias probability corresponding to the candidate alias output by the POI alias identification model; and screening out the at least one target alias in the candidate alias list based on alias probabilities of the candidate aliases, the pre-trained POI alias identification model being trained based on at least one piece of standard sample data obtained by:

based on query behavior-associated logs corresponding to a location service application, extracting a piece of sample group data comprising a user query formula, a user clicked POI, and a user actually visited POI for each query behavior-associated log, to obtain a plurality of pieces of sample group data corresponding to the query behavior-associated logs;

for each piece of sample group data, determining whether a user query formula thereof is different from a user clicked POI thereof and the user clicked POI thereof is identical with a user actually visited POI thereof, and determining the piece of piece target sample group to be a sample group in response to the user query formula thereof being different from a user clicked POI thereof and the user clicked POI thereof being identical with a user actually visited POI thereof;

constructing a piece of candidate sample data with the user query formula comprised in the target sample group as a candidate alias and a standard name of the user clicked POI as a standard name of a candidate sample POI;

acquiring word vectors of a candidate alias and the candidate sample POI of a piece of candidate sample data, and calculating a vector similarity between the candidate alias and the standard name of the corresponding candidate sample POI; and screening out the standard sample data in the candidate sample data based on the vector similarities corresponding to respective pieces the candidate sample data.

* * * * *